United States Patent [19]

Bray et al.

[11] Patent Number: 5,305,657
[45] Date of Patent: Apr. 26, 1994

[54] METHOD AND APPARATUS FOR CONTROLLING MANUAL DOWNSHIFTING IN AN AUTOMATIC TRANSMISSION

[75] Inventors: Steven C. Bray, Metamora; Daniel C. Wood, East Peoria; Randall M. Mitchell, Washington, all of Ill.

[73] Assignee: Caterpillar Inc., Peoria, Ill.

[21] Appl. No.: 881,279

[22] Filed: May 11, 1992

[51] Int. Cl.⁵ ............................................. B60K 41/12
[52] U.S. Cl. ..................................................... 74/861
[58] Field of Search ............................. 74/336 R, 861; 364/424.1

[56] References Cited

U.S. PATENT DOCUMENTS

| | | | |
|---|---|---|---|
| 3,052,134 | 9/1962 | Worster | 74/336 R X |
| 3,682,014 | 8/1972 | Magg et al. | 74/336 R |
| 3,791,239 | 2/1974 | Schreiner | 74/336 R X |
| 3,885,447 | 5/1975 | Braun et al. | 74/336 R |
| 3,937,107 | 2/1976 | Lentz | 74/861 |
| 4,164,876 | 8/1979 | Peppel | 74/336 R |
| 4,316,395 | 2/1982 | Brown | 74/336 R X |
| 4,800,660 | 1/1989 | Masao | 37/118 A |
| 5,053,962 | 10/1991 | Genise | 364/424.1 |
| 5,089,965 | 2/1992 | Braun | 364/424.1 |
| 5,161,432 | 11/1992 | Matsumoto et al. | 74/861 X |

FOREIGN PATENT DOCUMENTS

0270674B1 6/1991 European Pat. Off. .
1-29727 6/1989 Japan .

OTHER PUBLICATIONS

"Electronics and Hydraulics", *Automotive Engineer Ring*, Apr., 1986.
"Faster-Working Wheel Loaders Cut Cycle Times", Construction Equipment Magazine, Mar. 1989, pp. 125-137 (See Particularly, p. 131, Section Titled Eight Models Offered.

Primary Examiner—Leslie A. Brown
Assistant Examiner—Ryan W. Massey
Attorney, Agent, or Firm—R. Carl Wilbur

[57] ABSTRACT

An apparatus is provided for use in a vehicle having an engine driven transmission which includes a plurality of gear ratios. The apparatus includes a sensor adapted to sense a parameter indicative of vehicle speed and responsively produce a vehicle speed signal. A downshift switch is provided to controllably produce a downshift signal. An engine speed sensor senses engine speed and responsively produces an engine speed signal. A controller is adapted to receive the vehicle speed, engine speed, and downshift signals, process the vehicle speed signal to produce a transmission control signal, produce a down shift enable value as a function of the engine speed signal, and modify the transmission control signal to correspond to a lower gear ratio in all but the lowest gear ratio when the downshift signal is received and a value responsive to the vehicle speed signal is less than the down shift enable value signal. An actuator is adapted to receive the transmission control signal and responsively control the transmission gear ratio.

19 Claims, 5 Drawing Sheets

Fig_1_

Fig-2

Fig_4_

Fig_5

METHOD AND APPARATUS FOR CONTROLLING MANUAL DOWNSHIFTING IN AN AUTOMATIC TRANSMISSION

TECHNICAL FIELD

This invention relates generally to automatic transmission controls and, more particularly, to an electronic control system for an automatic transmission which allows a vehicle operator to controllably downshift the transmission at higher ground speeds than normal downshift speeds.

BACKGROUND ART

It is common to equip construction vehicles, such as wheel loaders, with automatic transmission controls which automatically shift the transmission in response to sensed operating parameters such as vehicle speed. Such controls typically include a gear selector for selecting a desired gear ratio and direction of travel. Gear changes are automatically effected up to the desired gear ratio in accordance with a shift map which relates the sensed parameter to gear ratio. Such controls are advantageous because the operator is not required to manually shift gear ratios and, hence, his/her hands are free to operate other controls such as implement and steering controls.

Figure 1:
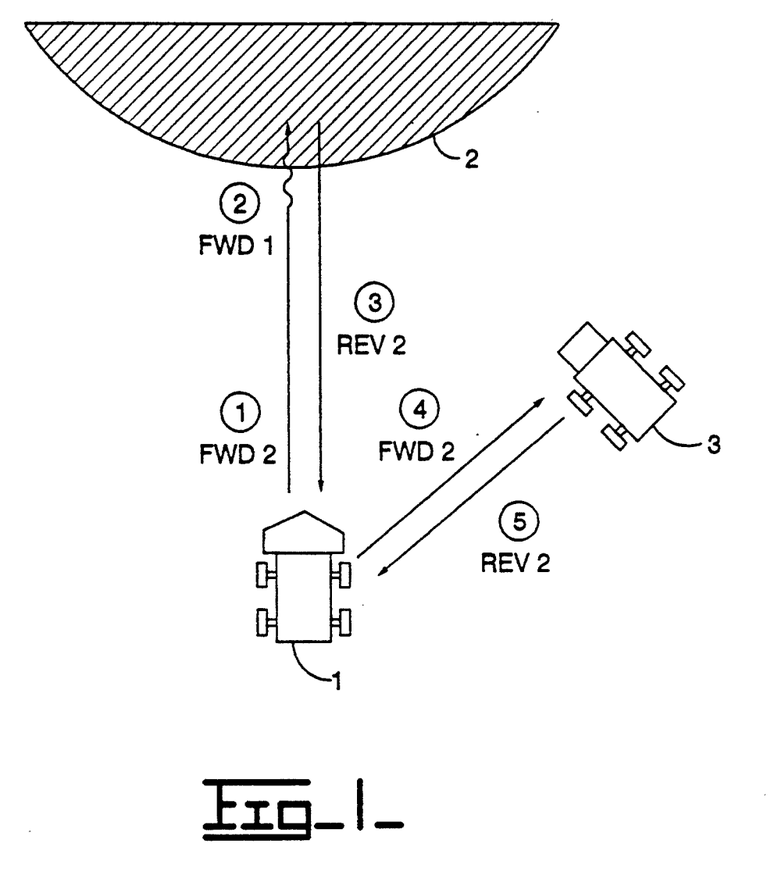
FIG. 1 is an illustration of a typical work cycle of a wheel loader.

Wheel loaders are commonly used to load raw material from a stock pile into a dump truck as illustrated in FIG. 1. Initially, the loader 1 approaches the pile 2 in a forward gear such as second gear forward FWD2 (operation 1). As the loader approaches the pile, a digging implement (bucket) is positioned to engage the pile. As the implement enters the pile, the vehicle's momentum is slowed and the transmission automatically shifts into first gear forward FWD1 (operation 2) as vehicle speed drops below the programmed shiftpoint. At the same time, the bucket is manipulated (i.e., raised) to obtain a load of material. The transmission is then manually shifted into a reverse gear using the gear selector, and the vehicle backs away from the stock pile (operation 3). Subsequently, the direction of the loader is changed so that the loader approaches the dump truck 3 (operation 4). Typically, the loader approaches the truck at a high speed in second gear forward F2. When the bucket is positioned over the truck, the load is dumped into the truck. The loader then backs away from the truck in a reverse gear ratio (operation 5). The above-described work cycle is repeated until the desired amount of material is deposited onto the truck.

Conventional automatic transmission controls are disadvantageous because entering the pile in second gear lugs down engine speed, thereby reducing the power available to operate the implement hydraulics. In order to avoid this problem it is desirable to effect a downshift to first gear forward just prior to entering the pile, thereby sustaining vehicle momentum and maintaining a high engine speed as the implement enters the pile. Similarly, it is desirable to downshift to first as the loader approaches the truck in order to maintain a high engine speed for rapidly lifting the bucket to its dump height. These are complicated operations in a conventional system because the operator is required to use one hand to control a steering device and one hand to manipulate an implement control lever. However, when a downshift is required, the operator must use one of his hands to manually effect the gear change.

In response to the above problems, U.S. Pat. No. 4,800,660, hereinafter '660, which issued on Jan. 31, 1989, provides a system which automatically downshifts the transmission when the implement is moved to a position suitable for digging. More specifically, the transmission is shifted into a lower gear ratio when the boom and bucket assume a preselected angle with respect to the loader. This system is problematic from the standpoint that the downshift occurs as soon as the implement assumes the preselected position. As such, it is difficult to precisely and correctly time the occurrence of the downshift. As was mentioned above, it is also desirable to be able to affect downshifts as the loader approaches the dump truck. '660 makes no mention of adapting its control to enable this type of downshift, nor would the disclosed system be readily adaptable to enable such downshifts. This is because a raised bucket position is used when approaching the truck and also when loading the vehicle. However, the '660 system provides no means for differentiating when the bucket is raised for loading and when it is raised for dumping.

Systems are also known which provide a downshift switch on an implement control lever. Such systems are advantageous because the desired downshifts can be effected by the same hand used to operate the implement control lever. However, known systems are disadvantageous because they permit excessive vehicle jerk and engine braking during a forced downshift. This is because downshifts are typically permitted at any ground speed, regardless of engine speed. If engine speed is low and ground speed is high, the transmission input speed following the downshift can greatly exceed the engine speed. In this situation excessive jerk and engine braking will occur.

One known system which provides a downshift switch is described in Japanese Patent Laid-open Number Sho 63-275432 titled "Automatic Speed Change Control Device of Shovel Loader." This system only permits automatic shifting when the vehicle speed is at full throttle. When the vehicle is not at full throttle, it appears that gear changes must be effected manually. The downshift switch is only operative when automatic shifting is operative, i.e. at full throttle. This system is disadvantageous because it only permits operation of the downshift switch at full-throttle and during automatic shifting. In many instances, it is desirable to allow downshifting using the downshift switch in the manual mode or when the engine speed is not at full throttle.

The present invention is directed towards overcoming one or more of the problems set forth above.

DISCLOSURE OF THE INVENTION

An apparatus is provided for use in a vehicle having an engine driven transmission which includes a plurality of gear ratios. The apparatus includes a sensor adapted to sense a parameter indicative of vehicle speed and responsively produce a vehicle speed signal, and a downshift switch adapted to controllably produce a downshift signal. An engine speed sensor is adapted to sense engine speed and responsively produce an engine speed signal. A controller is adapted to receive the vehicle speed, engine speed, and downshift signals, process the vehicle speed signal to produce a transmission control signal, produce a down shift enable value as a function of the engine speed signal, and modify the transmission control signal to correspond to a lower gear ratio in all but the lowest gear ratio when the downshift signal is received and a value responsive to the vehicle speed signal is less than the down shift enable value. An actuator is adapted to receive the transmission control signal and responsively control the transmission gear ratio.

BEST MODE FOR CARRYING OUT THE INVENTION

Figure 2:
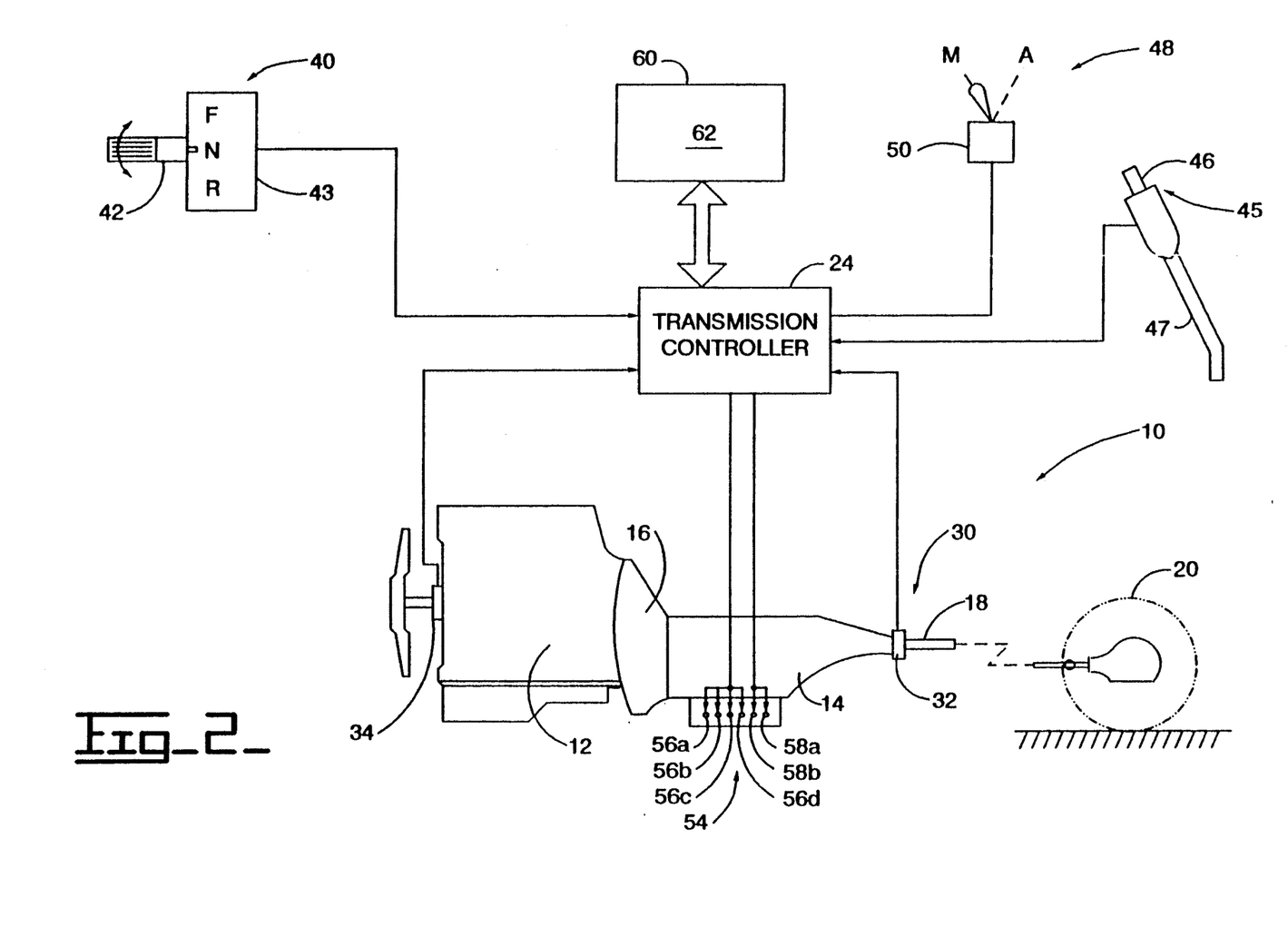
FIG. 2 is a schematic illustration of a preferred embodiment of a transmission control system which includes the present invention.

Referring now to FIG. 2, an embodiment of the immediate invention will be described in connection with a drive system 10 for a construction vehicle, such as a wheel type loader. The drive system 10 includes an engine 12 and a transmission 14 having a plurality of gear ratios. For illustration purposes, the invention is described in connection with a transmission which has four forward and four reverse gear ratios. The transmission 14 has an input connected to and driven by the engine 12 through a torque converter 16. An output shaft 18 of the transmission is connected to a vehicle drive wheel 20 such that engine output power or torque is transmitted to the wheel 20 for propelling the vehicle.

A transmission controller 24 is provided for controlling transmission gear ratio in response to sensed vehicle parameters. In the preferred embodiment, the controller 24 is implemented employing a microprocessor with appropriate input and output signal conditioning circuits (not shown) as is well known in the art. The microprocessor is programmed to produce transmission control signals for controlling the transmission's direction and gear ratio in response to sensed input parameters, as is explained below. Preferably the microprocessor is a series MC68HC11 microprocessor as manufactured by Motorola, Inc. of Schaumburg, Ill.; however, numerous other commercially available devices could readily be adapted to perform the functions of the controller 24.

A parameter sensor 30 is provided for sensing an operating parameter and responsively producing a parameter signal. In the preferred embodiment, the parameter signal is responsive to vehicle speed and in particular transmission input speed. For this purpose a vehicle speed sensor 32 is adapted to sense a parameter indicative of vehicle speed and responsively produce a vehicle speed signal. Preferably the vehicle speed sensor 32 is in the form of a magnetic speed pickup which is adapted to sense the rotational speed of the transmission output shaft 18 and responsively produce the vehicle speed signal. The controller 24 is adapted to receive the vehicle speed signal and produce a transmission input speed signal in response to the vehicle speed signal and the current transmission gear ratio, as would be apparent to one skilled in the art. It should be appreciated that the vehicle speed sensor 32 can be any type of sensor which accurately produces an electrical signal responsive to the shaft's speed. Additionally, it is foreseeable that the function of the vehicle speed sensor 32 could be performed by sensing other parameters such as transmission input speed.

An engine speed sensor 34 is adapted to sense the speed of the engine and responsively produce an engine speed signal. The speed sensor 34 can be of any type which accurately produces an electrical signal response to engine crankshaft speed. In the preferred embodiment, the speed sensor 34 is a magnetic speed pickup which is adapted to sense rotation of a flywheel ring gear (not shown) and responsively produce the engine speed signal.

A gear selector 40 is movable to a plurality of locations for indicating a desired transmission gear ratio and direction of travel. The gear selector 40 includes a handle or lever 42 which is rotatably positionable at any of four speed settings for indicating the first, second, third and fourth gear ratios, respectively. The handle 42 is also positionable at any one of three directional positions (F,N,R) for indicating forward, neutral and reverse directions of travel. It should be appreciated that the gear selector 40 could be embodied in any device or combination of devices capable of indicating a desired gear ratio and direction of travel. For example, the gear selector 40 could include two levers, one for indicating a desired gear ratio and one for indicating a desired direction of travel.

A selector sensor 43 is adapted to sense the position of the gear handle 42 and produce a desired gear ratio signal which corresponds to a desired transmission gear ratio and direction of travel. In the preferred embodiment, the selector sensor 43 is in the form of a plurality of switches (not shown) adapted to produce an 8 bit output signal in accordance with the following table:

| Handle Setting | OUTPUT BITS | | | | | | | |
|---|---|---|---|---|---|---|---|---|
| | FWD | FWDP | REV | REVP | SP1 | SP2 | SP3 | SP4 |
| FWD1 | GND | +B | | | GND | | | |
| FWD2 | GND | +B | | | | GND | | |
| FWD3 | GND | +B | | | | | GND | |
| FWD4 | GND | +B | | | | | | GND |
| NEUTRAL | | | | | | | | GND |
| REV1 | | | GND | +B | GND | | | |
| REV2 | | | GND | +B | | GND | | |
| REV3 | | | GND | +B | | | GND | |
| REV4 | | | GND | +B | | | | GND |

In Table 1, FWD1-4 and REV1-4 represent the four forward and reverse gear ratios, GND represents ground, +B represents plus battery potential, FWDP and REVP represent forward and reverse parity bits, SP1-SP4 four speed bits corresponding to the four gear ratios. As can be seen, the selector sensor 43 produces a unique output in each handle position. For example, when the handle is in the forward direction and the first speed setting, the FWD bit is pulled to ground, the FWDP bit is connected to +B, the first speed bit is connected to ground and the remaining five bits float. The controller 24 is adapted to receive the output signal from the selector sensor 43 and determine the desired gear ratio in a manner well known in the art.

A downshift switch 45 is provided for enabling the operator to downshift the transmission 14 from its present gear ratio. Preferably, the downshift switch 45 is in the form of a button 46 located on an implement control lever 47 used to position the bucket (not shown.) When the button 46 is depressed, a downshift signal is delivered to the controller 24. Locating the switch 45 on the implement control lever 47 is advantageous because it permits operation of both devices by the same hand. In some applications it might be desirable to locate the switch 45 in another location such as on a steering device (not shown). The downshift switch 45 could also be in the form of a foot operated device such as a pedal.

A mode selector 48 is provided for controllably producing one of an automode signal or a manual mode signal. In the preferred embodiment, the mode selector 48 includes a switch 50 which is adapted to produce the manualmode signal at a first position (M) and the automode signal at a second position (A).

A transmission actuator 54 is provided for receiving transmission control signals TRANSCTL and responsively controlling the transmission gear ratio. For this purpose, the transmission 14 is provided with a plurality of shift solenoids 56a-d which are adapted to receive electrical signals from the controller 24 and responsively control the transmission gear ratio. The transmission 14 is also provided with forward and reverse solenoids 58a, b which are adapted to receive forward and reverse signals from the controller 24 and responsively control the direction of the transmission 14. In the preferred embodiment, the solenoids are energized in accordance with the following table:

| TRANSCTL | (SOLENOIDS) | | | | | |
|---|---|---|---|---|---|---|
|  | FWD | REV | SP1 | SP2 | SP3 | SP4 |
| FWD1 | ON |  | ON |  |  |  |
| FWD2 | ON |  |  | ON |  |  |
| FWD3 | ON |  |  |  | ON |  |
| FWD4 | ON |  |  |  |  | ON |
| NEUTRAL |  |  |  |  |  | ON |
| REV1 |  | ON | ON |  |  |  |
| REV2 |  | ON |  | ON |  |  |
| REV3 |  | ON |  |  | ON |  |
| REV4 |  | ON |  |  |  | ON |

The controller 24 receives the automode, manualmode, parameter (i.e., vehicle speed), engine speed, downshift and desired gear ratio signals. The controller 24 operates in a manual mode when the manualmode signal is received and an automatic mode when the automode signal is received. In the manual mode the gear ratio is controlled in response to the position of the gear selector 40. More specifically, the controller 24 is operative to produce a transmission control signal which corresponds to the desired gear ratio signal. Each time the position of the gear selector 40 is changed, the transmission 14 is shifted accordingly. In this manner the transmission 14 can be operated in much the same manner as a standard transmission works in an automobile. In the manual mode, the downshift switch 45 is only operative for forcing a downshift from second gear to first gear in either direction. This permits operation of the downshift switch 45 in the manual mode when the vehicle is approaching the pile or a dump truck while prohibiting its use in higher gear ratios.

In the automatic mode, the transmission control signals are produced in response to the parameter signal and in accordance with a stored data which relates the sensed parameter to transmission gear ratio. For this purpose, a memory device 60 is provided for storing a shiftpoint map 62 which relates transmission gear ratio to the parameter signal. As was mentioned above, the parameter signal is preferably responsive to vehicle speed and transmission input speed in particular. While the present invention is described in connection with a shiftpoint map which is responsive to transmission input speed, it should be appreciated that the shiftpoint map could be responsive to other parameters such as engine speed, throttle opening, engine load and/or transmission output speed without departing from the scope of the present invention.

The shiftpoint map 62 provides upshift and downshift speeds for each gear ratio corresponding to the transmission input speed at which upshifts and downshifts are to occur in a respective gear ratio. The controller 24 is operative to retrieve the upshift and downshift speeds for the current gear ratio from the shiftpoint map 62. The controller 24 produces a transmission input speed signal which corresponds to the product of the current gear ratio and the transmission output speed. The controller 24 then compares the transmission input speed signal to the retrieved upshift and downshift speeds. If the transmission input speed signal is above the retrieved upshift speed a transmission control signal is produced which corresponds to then next highest gear ratio. Conversely, if the transmission input speed signal is below the retrieved downshift speed a transmission control signal corresponding to the next lower gear ratio is produced. If the transmission input speed signal is between the upshift and downshift speeds, the transmission control signal remains unchanged. In the automatic mode, the maximum gear allowed is limited to the desired gear signal as produced by the selector sensor 43. For example, if the handle 42 is in the third gear position, automatic shifting is performed up to and including the third gear ratio.

Figure 3:
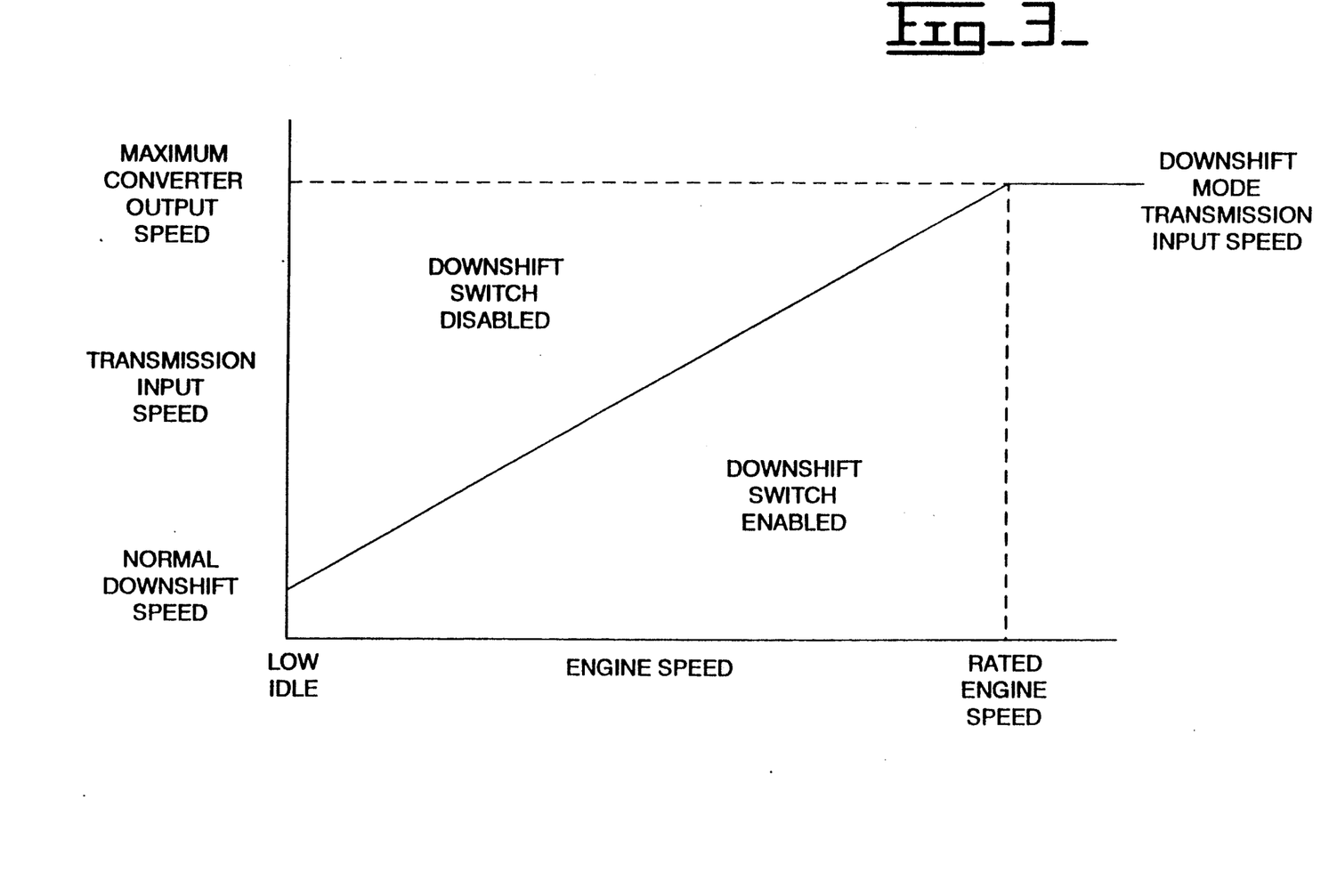
FIG. 3 is a graph illustrating a relationship between engine speed and transmission input speed as employed in the present invention.

The downshift switch 45 is operative in the automatic mode for "forcing" a downshift to a lower gear ratio in all but the lowest gear ratio, i.e., in all but first gear forward and reverse FWD1, REV1. Downshifts are permitted as long as the transmission input speed signal is below a preselected down shift enable value which varies as a function of engine speed. Preferably, the preselected down shift enable value varies in accordance with the following equation:

DWN_SHFT_ENBL=MAXSPD−K1 * (RATEDSPD−ENGSPD)

Where DWN_SHFT_ENBL is the preselected value, MAXSPD is the engine run out speed, K1 is an empirically determined constant, RATEDSPD is the rated engine speed and ENGSPD is the actual engine speed. This relationship is illustrated in FIG. 3. As can be seen from FIG. 3, the equation generates a curve which varies from a minimum corresponding to the normal downshift speed when the engine is at low idle to a maximum corresponding to the maximum allowable converter output speed; i.e., maximum allowable transmission input speed when the engine is at rated speed. In the preferred embodiment, the value of K1 id 0.95; however, this is purely a matter of design preference and should not be construed to limit the scope of the present invention. The effect of this test is to prevent downshifts which will result in a transmission output speed which greatly exceeds the speed of the engine 12 and thus cause excessive vehicle jerk and engine braking. It should be appreciated that the above disclosed test is one of numerous methods for achieving the desired result. For example, the controller 24 could be operative for calculating the predicted transmission input speed following the shift. This predicted value could be compared to the current engine speed to determine if the downshift should be permitted. It is also conceivable that the test could also be performed by directly comparing the vehicle speed signal to a value which varies as a function of engine speed.

Figure 4:
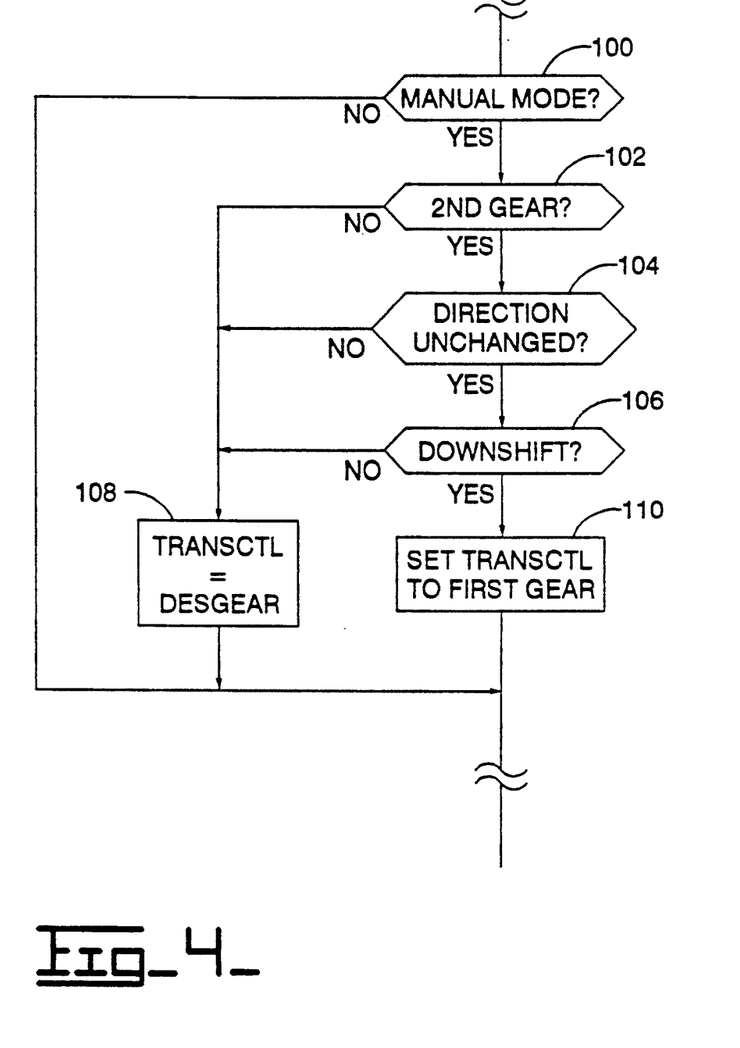
FIGS. 4 and 5 are software flowcharts for practicing certain aspects of the present invention.
Figure 5:
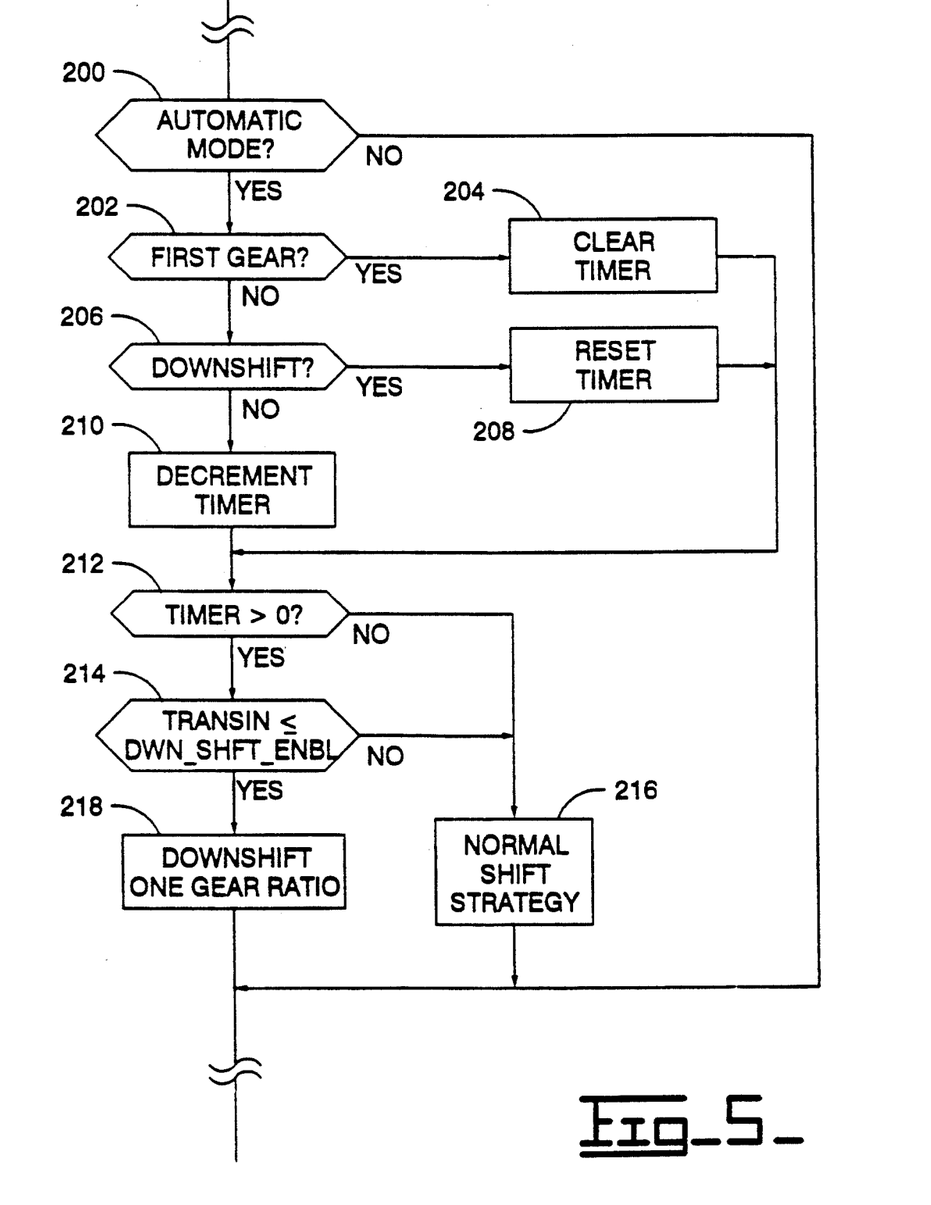

Referring now to FIGS. 4 and 5, an embodiment of software for programming the controller 24 in accordance with certain aspects of the immediate invention is explained. FIGS. 4 and 5 are flowcharts illustrating a computer software program for implementing the preferred embodiment of the present invention. The program depicted in these flowcharts is particularly well adapted for use with the microprocessor and associated components described above, although any suitable microprocessor may be utilized in practicing an embodiment of the present invention. These flowcharts constitute a complete and workable design of the preferred software program which has been reduced to practice on the series MC68HC11 microprocessor system. The software program may be readily coded from these detailed flowcharts using the instruction set associated with this system, or may be coded with the instructions of any other suitable conventional microprocessors. The process of writing software code from flowcharts such as these is a mere mechanical step for one skilled in the art.

Referring initially to FIG. 4, operation of the downshift switch 45 in the manual mode will be explained. Initially in the block 100, the controller 24 determines if the system is operating in the manual mode by checking for the presence of the manualmode signal. If the manual mode is not requested, control is returned to the main control loop, not shown.

If the manual mode is selected, control is passed to the block 102, where the controller 24 samples the desired gear ratio signal to determine if the desired gear ratio corresponds to second gear forward or reverse FWD2, REV2. If the answer is negative, control is passed to the block 108 where the transmission control signal is produced in accordance with the desired gear ratio signal. If the test in the block 102 is answered in the affirmative, control is passed to the block 104 where it is determined if a directional change, e.g. forward to reverse, has been performed since the last pass through the control loop. This is determined by comparing the previous gear ratio to the current gear ratio. If a directional change has been performed, control is passed to the block 108. However, if no direction change has occurred, control is passed to the block 106 where the controller 24 checks for the presence of the downshift signal. If the downshift signal is detected, the transmission 14 is downshifted to the first gear ratio in the block 110. The transmission 14 remains in the first gear ratio until the gear selector 40 is subsequently moved to indicate a new desired gear ratio.

The above-described strategy is employed to limit use of the downshift switch 45 during the manual mode. However, it should be apparent that in some applications, it might be desirable to adopt a different strategy. For example, in some applications it might be beneficial to permit operation of the downshift switch 45 in higher gear ratios.

Referring now to FIG. 5, operation of the downshift switch 45 in the automatic mode will be explained. Initially in the block 200, the controller 24 detects whether the automatic mode is requested by sampling for the presence of the automode signal. If the automatic mode is not requested, control is returned to the main control loop. Conversely, if the automatic mode is requested, control is passed to the block 202.

In the block 202, the controller 24 determines if the transmission 14 is currently in either first gear forward or first gear reverse FWD1, REV1. If the test in block 202 is answered in the affirmative, control is passed to the block 204 where a downshift timer is cleared, i.e., set to zero. The blocks 202 and 204 are effective to prevent operation of the downshift switch 45 when the transmission is in first gear forward FWD1 or first gear reverse REV1, thereby preventing downshifts into neutral.

Control is then passed to the block 206 where it is determined if the downshift switch 45 is depressed by sampling for the presence of the downshift signal. If the downshift signal is detected, control is passed to the block 208 where a downshift timer is set to a preselected value. In the preferred embodiment, the timer is set to 3 seconds; however, this value is purely a matter of design preference and should not be construed to limit the scope of the present invention. The timer is operative to prevent the controller 24 from upshifting the transmission 14 for 3 seconds following release of the downshift switch 45. After timer is set, control is passed to the block 212.

If the downshift signal is not detected in the block 206, control is passed to the block 210 where the timer is decremented so that it corresponds to the amount of time elapsed since the downshift switch 45 was released. Control is then passed to the block 212 where controller 24 determines if the downshift timer is cleared, i.e., if it equals zero. This is the case if the downshift timer has been cleared in the block 204 or 3 seconds following release of the downshift switch 45. If the downshift timer cleared, control is passed to the block 216 where the transmission gear ratio is controlled in accordance with the normal shift strategy, as was described above. Conversely, if the timer is not cleared, control is passed to the block 214. In the block 214, the controller 24 compares the transmission input speed to the DWN_SHFT_ENBL value which is calculated in response to engine speed as described above. If the transmission input speed is less than or equal to the DWN_SHFT_ENBL value, control is passed to the block 218, where the transmission is downshifted one gear ratio. However, if the transmission input speed signal exceeds the DWN_SHFT_ENBL value, control is passed to the block 216.

Industrial Applicability

It is felt that an ideal application for the present invention is a construction vehicle such as a wheel type loader. In such an environment, the present invention is beneficial because it allows downshifts at higher ground speeds than normal downshift speeds.

In the manual mode, the controller 24 is operative to permit downshifts using the downshift switch from second gear forward FWD2 to first gear forward FWD1 and from second gear reverse REV2 to first gear reverse REV1. Use of the downshift switch 45 is limited in the manual mode because these are the gear ratios in which the downshift button is most beneficial.

In the automatic mode, the downshift switch 45 is operative in all gear ratios except for the lowest gear ratio, i.e., except for first gear forward and reverse. As the vehicle approaches the pile, the downshift switch 45 is at a point where a downshift is desired. So long as the downshift switch 45 is depressed, control will loop through the blocks 200, 202, 206, 208, 212, 214 and 218. Downshifts will be effected as the transmission input speed drops below the DWN_SHFT_ENBL value in the block 214. In this manner multiple gears downshifts can be effected by continuing to depress the downshift switch 45. Once the downshift switch 45 is released, the test in the block 206 is answered in the negative and the timer is no longer reset in the block 208. After the timer times out (i.e., 3 seconds), control is passed to the block 216 where shifts are effected in accordance with the shiftpoint map 62.

Other aspects, objects, and advantages of this invention can be obtained from a study of the drawings, the disclosure and the appended claims.

We claim:

1. An apparatus for use in a vehicle having an engine driven transmission which includes a plurality of gear ratios, comprising:
   a sensor, wherein said sensor senses a parameter indicative of vehicle speed and responsively produces a vehicle speed signal;
   a downshift switch, wherein said downshift switch controllably produces a downshift signal;
   an engine speed sensor, wherein said engine speed sensor senses engine speed and responsively produces an engine speed signal;
   a controller, wherein said controller receives the vehicle speed, engine speed, and downshift signals, processes the vehicle speed signal to produce a transmission control signal, produces a down shift enable value as a function of the engine speed signal, and modifies the transmission control signal to correspond to a lower gear ratio in all but the lowest gear ratio when the downshift signal is received and a value responsive to the vehicle speed signal is less than the down shift enable value; and
   an actuator, wherein said actuator receives the transmission control signal and responsively controls the transmission gear ratio.

2. An apparatus as set forth in claim 1, where the down shift enable value increases as the engine speed signal increases.

3. An apparatus as set forth in claim 2 wherein the down shift enable value is produced in accordance with the following equation:

DWN_SHFT_ENBL=MAXSPD−K1 *
(RATEDSPD−ENGSPD)

where DWN_SHFT_ENBL is the downshift enable value, MAXSPD is the engine run out speed, K1 is an empirically determined constant, RATEDSPD is the rated engine speed, and ENGSPD is the actual engine speed.

4. An apparatus as set forth in claim 1 wherein the modified transmission control signal is produced for a preselected period of time following termination of the downshift signal.

5. An apparatus as set forth in claim 1 wherein the controller modifies the transmission control signal to correspond to the next lower gear ratio in all but the lowest gear ratio when the downshift signal is received and a value responsive to the vehicle speed signal is less than the down shift enable value.

6. An apparatus as set forth in claim 5 wherein the value responsive to the vehicle speed signal corresponds to the transmission input speed.

7. An apparatus for use in a vehicle having an engine driven transmission which includes a plurality of gear ratios, comprising:
   a sensor, wherein said sensor senses an operating parameter and responsively produces a parameter;
   a speed sensor, wherein said speed sensor senses a parameter indicative of transmission input speed and responsively produces a transmission input speed signal;
   a downshift switch, wherein said downshift switch controllably produces a downshift signal;
   an engine speed sensor, wherein said engine speed sensor senses engine speed and responsively produces an engine speed signal;
   a controller, wherein said controller receives the parameter, transmission input, engine speed, and downshift signals, processes the parameter signal to produce a transmission control signal, produces a down shift enable value as a function of the engine speed signal, and modifies the transmission control signal to correspond to a lower gear ratio in all but the lowest gear ratio when the downshift signal is received and the transmission input speed signal is less than the down shift enable value; and
   an actuator, wherein said actuator receives the transmission control signal and responsively controls the transmission gear ratio.

8. An apparatus as set forth in claim 7, where the down shift enable value increases as the engine speed signal increases.

9. An apparatus as set forth in claim 8 wherein the down shift enable value is produced in accordance with the following equation:

DWN_SHFT_ENBL=MAXSPD−K1 *
(RATEDSPD−ENGSPD)

where DWN_SHFT_ENBL is the down shift enable value, MAXSPD is the engine run out speed, K1 is an empirically determined constant, RATEDSPD is the rated engine speed, and ENGSPD is the actual engine speed.

10. An apparatus as set forth in claim 7 wherein the modified transmission control signal is produced for a preselected period of time following termination of the downshift signal.

11. An apparatus as set forth in claim 7 wherein the controller modifies the transmission control signal to correspond to the next lower gear ratio in all but the lowest gear ratio when the downshift signal is received and a value responsive to the vehicle speed signal is less than the down shift enable value.

12. An apparatus as set forth in claim 11 wherein the speed sensor senses transmission output speed and responsively produces a vehicle speed signal and the controller receives the vehicle speed signal and produces the transmission input speed signal in response to the vehicle speed signal and the transmission gear ratio.

13. An apparatus for use in a vehicle having an engine driven transmission which includes a plurality of gear ratios, comprising:
- a sensor, wherein said sensor senses a parameter indicative of vehicle speed and responsively produces a vehicle speed signal;
- a downshift switch, wherein said downshift switch controllably produces a downshift signal;
- an engine speed sensor, wherein said engine speed sensor senses engine speed and responsively produces an engine speed signal;
- a controller, wherein said controller receives the vehicle speed, engine speed, and downshift signals, processes the vehicle speed signal to produce a transmission control signal, processes the vehicle speed signal to produce a transmission input speed signal, produces a down shift enable value which increases proportionally with the engine speed signal, and modifies the transmission control signal to correspond to a lower gear ratio in all but the lowest gear ratio when the downshift signal is received and the transmission input speed signal is less than the down shift enable value; and
- an actuator, wherein said actuator receives the transmission control signal and responsively controls the transmission gear ratio.

14. A method for use in a vehicle having an engine driven transmission which includes a plurality of gear ratios, a speed sensor, wherein said speed sensor senses a parameter indicative of vehicle speed and responsively produces a vehicle speed signal, and a downshift switch, wherein said downshift switch controllably produces a downshift signal, comprising the steps of:
- producing a transmission control signal in response to the vehicle speed signal;
- producing a down shift enable value as a function of engine speed;
- modifying the transmission control signal to correspond to a lower gear ratio in all but the lowest gear ratio when the downshift signal is received and a value responsive to the vehicle speed signal is less than the down shift enable value; and
- controlling the transmission gear ratio in response to the transmission control signal.

15. A method as set forth in claim 14, where the down shift enable value increases as the engine speed signal increases.

16. An method as set forth in claim 14 wherein the down shift enable value is produced in accordance with the following equation:

$$DWN\_SHFT\_ENBL = MAXSPD - K1 * (RATEDSPD - ENGSPD)$$

where DWN_SHFT_ENBL is the down shift enable value, MAXSPD is the engine run out speed, K1 is an empirically determined constant, RATEDSPD is the rated engine speed, and ENGSPD is the actual engine speed.

17. A method as set forth in claim 14 wherein the modified transmission control signal is produced for a preselected period of time following termination of the downshift signal.

18. A method as set forth in claim 14 including the step of modifying the transmission control signal to correspond to the next lower gear ratio in all but the lowest gear ratio when the downshift signal is received and a value responsive to the vehicle speed signal is less than the down shift enable value.

19. A method as set forth in claim 14 wherein the value responsive to the vehicle speed signal corresponds to the transmission input speed.

* * * * *